May 12, 1970     P. A. GIRAGOSIAN     3,511,453
CONTROLLABLE REENTRY VEHICLE
Filed April 27, 1967     2 Sheets-Sheet 1

INVENTOR
PAKRAD A. GIRAGOSIAN
BY Carole M. Calnan
ATTORNEY

May 12, 1970  P. A. GIRAGOSIAN  3,511,453
CONTROLLABLE REENTRY VEHICLE
Filed April 27, 1967  2 Sheets-Sheet 2

INVENTOR
PAKRAD A. GIRAGOSIAN
BY Carole M. Calman
ATTORNEY

United States Patent Office 3,511,453
Patented May 12, 1970

---

3,511,453
CONTROLLABLE REENTRY VEHICLE
Pakrad A. Giragosian, West Concord, Mass., assignor to Raytheon Company, Lexington, Mass., a corporation of Delaware
Filed Apr. 27, 1967, Ser. No. 634,167
Int. Cl. B64c
U.S. Cl. 244—1                                   6 Claims

ABSTRACT OF THE DISCLOSURE

A vehicle having a sensor for examining the terrain, a computer responsive to the sensor for determining how the vehicle's flight should be changed, a controller responsive to the computer output which selectively drives hydraulic actuators, and vehicle control surfaces which are moved inwardly to a position below the rigid outer surface of the vehicle by the actuators.

BACKGROUND OF THE INVENTION

Field of the invention

This invention is concerned with re-entry vehicles and, more particularly, with vehicles having aerodynamic means for controlling the vehicle drive path.

Description of the prior art

Present day vehicles utilize fins, flaps, canards, etc. to aerodynamically control the vehicles, which have numerous disadvantages. For instance, such control devices receive shock wave impingement on their surfaces because they are immersed in the free gas stream flow and shock layer, thus being exposed to high heating rates. The lift of these controls detracts from the lift of the vehicle. The radar cross-section of these reentry vehicles is quite high, which is undesirable for attack purposes. Also, these aerodynamic controls add considerable weight to the vehicle that could better be used for the storage of the gas supply or for an increase in payload size in an attack vehicle.

SUMMARY OF THE INVENTION

A controllable vehicle having an outer surface including a plurality of control surfaces, and actuator means for selectively depressing and elevating said control surfaces.

DESCRIPTION OF THE PREFERRED EMBODIMENT

Figure 1:
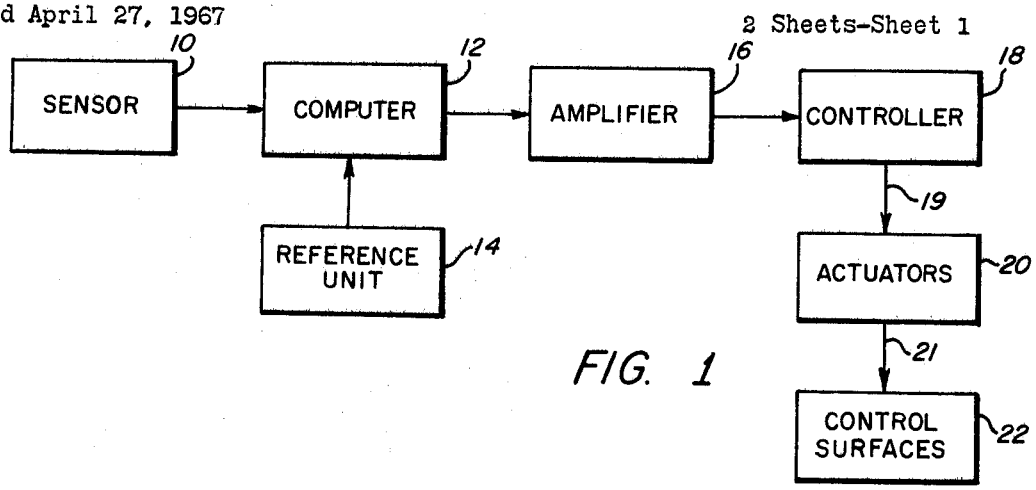
FIG. 1 is a block diagram of a reentry vehicle control system.

A vehicle control system is shown in FIG. 1 and comprises computer 12 connected to sensor 10 and reference unit 14, amplifier 16 connected between computer 12 and controller 18, and actuators 20 connected between controller 18 and control surfaces 22. Sensor 10 may comprise a radar which surveys the terrain and applies terrain information to computer 12. Reference unit 14 may comprise a storage unit which stores map information describing the desired terrain. Computer 12 compares the information from sensor 10 and reference unit 14 in order to determine how the vehicle motion must be changed in order to achieve the desired location, and then generates a digital word describing the desired vehicle attitude. The word output of computer 12 is then applied to amplifier 16 where it is enhanced before being applied to controller 18. Controller 18 may comprise an encoder which interprets the digital word produced by computer 12 and in response thereto generates a selected amplitude signal on one or more of its output lines. Line 19 is used to represent six lines. There are six actuators 20 which may comprise hydraulic actuators or electronic actuators for depressing or lifting up the desired vehicle control surface by an amount determined by the input signals from controller 18. Output line 21 represents six lines which selectively actuate one or more of the six control surfaces 22. Each of control surfaces 22 comprises a portion of the outer surface of reentry vehicle 8.

Figures 2, 3:
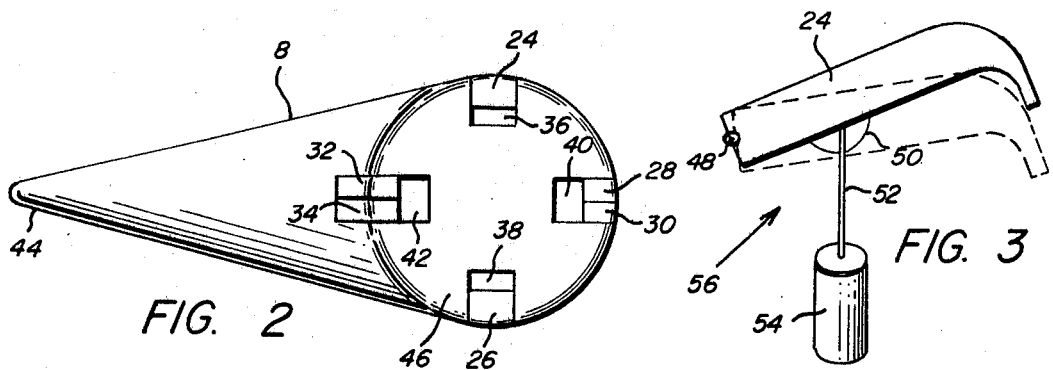
FIG. 2 is a diagrammatic representation of a reentry vehicle having a plurality of nondepressed and nonelevated control surfaces.
FIG. 3 is a diagrammatic representation of a hydraulic actuator connected to a control surface.

Cone-shaped reentry vehicle 8 is shown in detail in FIG. 2 having nose 44 which is substantially smaller in radius than the rear 46. Control surfaces 22 comprise upper control surface 24, lower control surface 26, right control surfaces 28 and 30, and left control surfaces 32 and 34. Control surfaces 24 and 26 provide pitch control while control surfaces 28, 30, 32, and 34 provide yaw control. Each control surface comprises a portion of the outer surface of reentry vehicle 8 and can be depressed or elevated. The outer surface may be made of boron pyrolytic graphite. Holes 36 and 38 receive control surfaces 24 and 26, respectively, when they are depressed. Similarly, hole 40 receives depressed control surfaces 28 and 30, and hole 42 receives depressed control surfaces 32 and 34. As shown in FIG. 2, control surfaces 24, 26, 28, 30, 32, and 34 are neither depressed nor elevated and hence provide a normal outer surface of reentry vehicle 8 which propagates in a straight line. Reentry vehicle 8 may include a booster (not shown) providing a propulsion system and using a form of gunpowder as the actuating substance. The booster is the usual type which separates from vehicle 8 after providing the desired initial velocity.

FIG. 3 depicts a hydraulic actuator 56 for depressing or elevating control surface 24. It should be appreciated that reentry vehicle 8 contains six hydraulic actuators with each one driving a different control surface. Hinge 48 allows control surface 24 to move freely in an upward or downward direction. Fastener 50 connects control surface 24 to hydraulic actuator 56 which comprises push/pull rod 52 connected to hydraulic motor 54. In response to a signal from controller 18, hydraulic motor 54 selectively raises or lowers push/pull rod 52 that in turn raises or lower control surface 24.

Figures 4, 5:
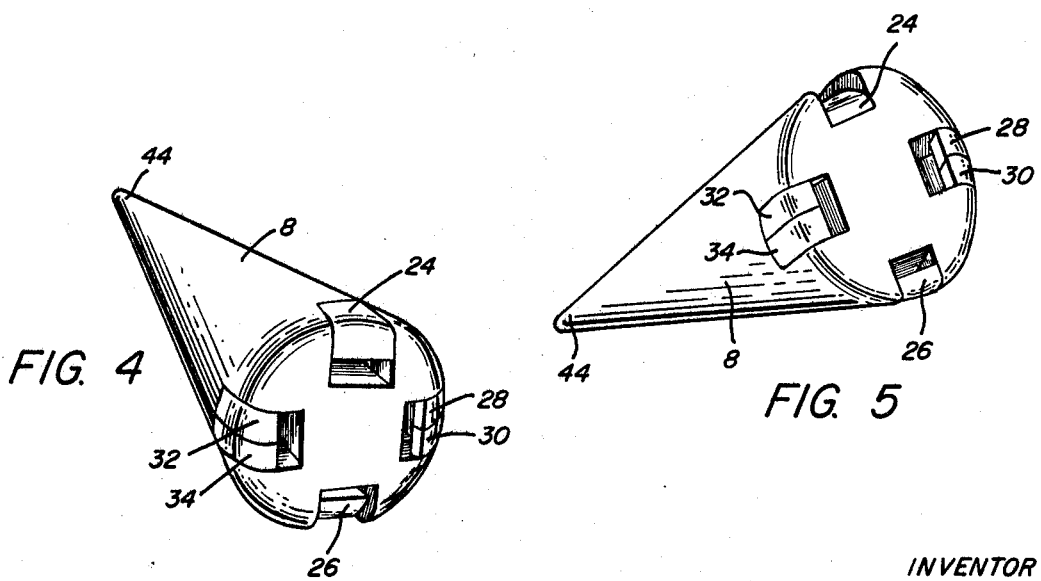
FIG. 4 is a diagrammatic representation of a reentry vehicle having its nose in an upward direction and bottom control surface deflected inward.
FIG. 5 is a diagrammatic representation of a reentry vehicle having its nose in a downward direction and top control surface deflected inward.

Reentry vehicle 8 is shown in FIG. 4 with its nose 44 positioned upward. This is accomplished by having controller 18 allow upper control surface 24, right side control surfaces 28 and 30, and left side control surfaces 32 and 34 to remain in the neutral position while causing bottom control surface 26 to be deflected inward. Consequently, nose 44 of reentry vehicle 8 is positioned in an upward direction by deflecting in bottom control surface 26, only, and keeping control surfaces 24, 28, 30, 32, and 34 in their neutral position.

FIG. 5 depicts reentry vehicle 8 with its nose 44 down. In order to accomplish this, controller 18 deflects in top control surface 24 and allows right side control surfaces 28 and 30, left side control surfaces 32 and 34, and lower control surface 26 to remain in the neutral position. Accordingly, nose 44 of reentry vehicle 8 is positioned in a downward direction by deflecting in top control surface 24, only, and maintaining control surfaces 28, 30, 32, 34, and 26 in their neutral position.

Figure 6:
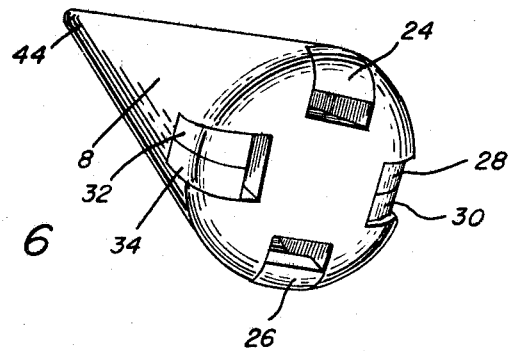
FIG. 6 is a diagrammatic representation of a reentry vehicle having its nose pointed in the left direction and both right control surfaces deflected inward; and, FIG. 7 is a diagrammatic representation of a reentry vehicle rolling to the right and having the upper right control surface and lower left control surface deflected inward.

Reentry vehicle 8 is shown in FIG. 6 with its nose 44 pointed to the left. This is accomplished by having controller 18 deflect right control surfaces 28 and 30 while allowing top control surface 24, bottom control surface 26, and left side control surfaces 32 and 34 to stay in their neutral position. Consequently, nose 44 of reentry vehicle 8 is positioned in the left direction by deflecting in both right side control surfaces 28 and 30, and keeping control surfaces 24, 26, 32, and 34 in their neutral position. From this description, it should be apparent that in order to turn nose 44 to the right, controller 18 deflects left side control surfaces 32 and 34 while maintaining top control surface 24, right control surfaces 28 and 30, and bottom control surface 26 in their neutral positions.

Figure 7:
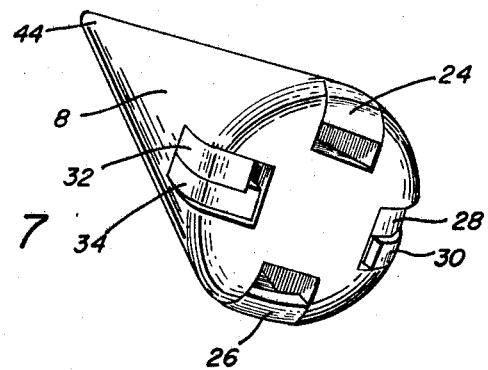

As depicted in FIG. 7, reentry vehicle 8 is selectively positioned in order to cause it to roll to the right. In order to accomplish this, controller 18 deflects in upper right side control surface 28 and lower left side control surface 34 while maintaining upper control surface 24, lower right side control surface 30, bottom control surface 26, and upper left side control surface 32 in their neutral positions. Accordingly, vehicle 8 is rotated to the right by deflecting in upper right control surface 28 and lower left control surface 34, and keeping control surfaces 24, 30, 26, and 32 in their neutral positions.

The survival of reentry vehicle 8 or any reentry vehicle is greatly enhanced by its maneuvering capabilities during all phases of its flights. As was shown previously, reentry vehicle 8 has exceptional maneuvering capabilities. Reentry vehicle 8 may comprise a ballistic or maneuvering reentry vehicle. Control surfaces 24, 26, 28, 30, 32, and 34 may be operated inwardly in order to create aerodynamic instability by removing one of the opposing controls from the stream of gas around it. For the earth system, air is such a gas; but for a planet system, nitrogen or oxygen may be such a gas. Aerodynamic instability is a force tending to rotate reentry vehicle 8 so as to cause tumbling, and it trims reentry vehicle 8 at a specific angle of attack depending on the inward deflection of control surfaces 22 which allow reentry vehicle 8 to achieve maneuverable flight. When controller 18 simultaneously deflects all control surfaces 22 inward, a lower drag area term for reentry vehicle 8 results, hence allowing for less retardation of the flight velocities than that of the basic uncontrolled reentry vehicle.

The thermal load and shock on control surfaces 22 are never greater than those on the surface of reentry vehicle 8 and may be considerably lower. There is no shock wave impingement on control surfaces 22 occurring as there would be for fins, flaps, cannards, etc. which are immersed in the free gas stream flow and shock layer and consequently exposed to high heating rates. The lift of the control does not detract from the lift of the basic vehicle as in the conventional case for flaps or fins. The drag-area term of reentry vehicle 8 is adjustable by selectively moving all control surfaces 22 inwardly so that deceit of trajectory path properties may result. The radar cross-section of reentry vehicle 8 is less than that of a similar finned or flapped vehicle. Possible military and commercial uses of the invention include both ballistic and maneuvering reentry vehicle applications whether for manned or unmanned missions. The inward control means presented herein differs from other known modes of control in that previous aerodynamic controls have extended out to and beyond the shock layer of the vehicle, hence, exposing these surfaces to high heating rates and thermal shock which may jeopardize the structural and functional integrity of the extended control surfaces. This invention utilizes less weight than conventional vehicles because a portion of the basic vehicle structure comprises control surfaces 22.

I claim:

1. A control system for a vehicle moving through a fluid comprising:
   an outer rigid surface enclosing the vehicle and including control surface means forming a portion of the outer rigid surface; and
   actuator means coupled to the control surface means for depressing inward below the outer surface selective portions of the control surface means.

2. A control system for a vehicle moving through a fluid comprising:
   an outer rigid surface enclosing the vehicle and including control surface means forming a portion of a rigid surface of the vehicle transverse to the vehicle longitudinal axis and extending around therefrom to form a portion of the side surface thereof; and
   actuator means coupled to the control surface means for depressing inwards below the outer surface selective portions of the control surface means.

3. A control system for a vehicle moving through a fluid comprising an outer rigid surace enclosing the vehicle and including control surface means forming a portion of a rigid surface of the vehicle transverse to the vehicle longitudinal axis and extending around therefrom to form a portion of the side surface thereof, the control surface means comprising:
   a first pair of diametrically opposed recessible surface body flaps; and
   a second pair of diametrically opposed recessible surface body flaps orthogonal on the transverse rigid surface to the first pair;
   the system further comprises:
   actuator means coupled to the first and second pair of surface body flaps for depressing inwards below the outer rigid surface selective portions of selected ones of the flaps.

4. A control system for a vehicle moving through a fluid comprising an outer rigid surface enclosing the vehicle and including control surface means forming a portion of a rigid surface of the vehicle transverse to the vehicle longitudinal axis and extending around therefrom to form a portion of the side surface thereof, the control surface means comprising:
   a first pair of diametrically opposed recessible surface body flaps;
   a pair of side-by-side recessible surface body flaps; and
   a second pair of side-by-side recessible surface body flaps diametrically opposed to the first pair, the first and second pair of side-by-side flaps being orthogonal on the transverse rigid surface to the pair of diametrically opposed flaps;
   the system comprises:
   actuator means coupled to the control surface means for depressing inwards below the outer rigid surface selective portions of the control surface means, the actuator means including:
   means for depressing one body flap of the first pair and for simultaneously depressing a non-corresponding body flap of the second pair.

5. A control system according to claim 2 wherein the outer rigid surface enclosing the vehicle is formed from pyrolytic boron graphite.

6. A control system according to claim 2 wherein:
the vehicle outer rigid surface is conically shaped; and
the transverse rigid surface is the rigid surface disposed opposite the nose of the cone.

References Cited

UNITED STATES PATENTS

| | | | |
|---|---|---|---|
| 2,805,032 | 9/1957 | Davis | 244—75 |
| 3,125,313 | 3/1964 | Soderberg | 244—87 |
| 3,343,769 | 9/1967 | Basnett | 244—152 |

MILTON BUCHLER, Primary Examiner

J. L. FORMAN, Assistant Examiner

U.S. Cl. X.R.

244—75